United States Patent

Wortley

[11] 4,190,322
[45] Feb. 26, 1980

[54] MAGNIFYING MEANS

[76] Inventor: Stewart W. Wortley, 1814 S. Cheyenne, Tulsa, Okla. 74119

[21] Appl. No.: 823,932

[22] Filed: Sep. 1, 1977

[51] Int. Cl.² .............................................. G02B 13/12
[52] U.S. Cl. ..................................... 350/181; 350/70; 350/115; 350/116; 350/190; 350/231
[58] Field of Search ................. 350/190, 181, 70, 115, 350/116, 231

[56] References Cited

U.S. PATENT DOCUMENTS

| 1,865,326 | 6/1932 | Marshall | 350/181 X |
| 2,161,368 | 6/1939 | McLeod | 350/190 |
| 3,428,286 | 2/1969 | Del Pesco | 351/57 X |

*Primary Examiner*—Paul A. Sacher
*Attorney, Agent, or Firm*—Head & Johnson

[57] ABSTRACT

A magnifying apparatus comprising a pair of mutually adjustable complementary magnifying elements wherein one of the elements is an elongated member having one flat surface and one transversely arcuate surface, and the other element is of a circular configuration having at least one convex surface.

4 Claims, 7 Drawing Figures 4,190,322

MAGNIFYING MEANS

BACKGROUND OF THE INVENTION

1. Field of the Invention

This invention relates to improvements in magnifying apparatus and more particularly, but not by way of limitation, to a magnifying apparatus comprising complementary magnifying element for greatly increasing magnification.

2. Description of the Prior Art

Magnifying devices are old and well known and have been in widespread use for many years. The most commonly used device of this type is frequently called a magnifying glass and usually comprises a single lens or transparent element having at least one arcuate surface and which may be manually manipulated in a manner for proper relationship with the material to be magnified whereby a certain amount of magnification may be attained. These devices are helpful, but in many instances it is highly desirable to provide a considerably greater power of magnification than is possible with the present day magnifying glasses, as for example in map drafting operations, or the like, wherein relatively small items must be viewed and/or transcribed. At the present time the only devices available for achieving these greater powers of magnification are expensive and somewhat complicated in operation.

SUMMARY OF THE INVENTION

The present invention contemplates a novel magnifying apparatus which has been particularly designed and constructed for producing exceedingly great magnification in a manner which is simple in operation and economical in construction. The novel magnification apparatus comprises a pair of complementary magnifying elements which may be freely and infinitely adjusted with respect to each other for producing great magnification at substantially universal viewing around the apparatus. One of the elements comprises an elongated transparent member whose cross sectional configuration is a sector of a circle. The elongated element is cut or severed from a cylinder in such a manner that one face of the elongated member is flat and corresponds to the plane determined by a chord of a cross section of the cylinder, and the opposite face thereof is a segment of the outer periphery of the cylinder. Whereas the width or depth of the elongated member may be substantially any dimension as desired, it has been found that a relatively thin "slice" of the cylinder provides exceptionally great magnification when utilized in combination with the complementary magnifying member.

The second magnifying element is preferably of a substantially circular configuration, and at least one face of the disc is convex. If desired, one face of the disc may be flat or planar and the opposite face convex, or both faces may be convex, or one face may be concave and the opposite face convex. It is important, however, that at least one of the faces of the disc be convex.

In use, one of the magnifying elements, such as the elongated element, may be disposed adjacent to or in the proximity of the material to be magnified, and the other of the magnifying elements, such as the disc, may be disposed either immediately adjacent or in spaced relation to the first element as required for producing the desired power of magnification. The complementary configurations of the two magnifying elements produces great magnification from substantially any angle of viewing.

DESCRIPTION OF THE PREFERRED EMBODIMENTS

Figure 1:
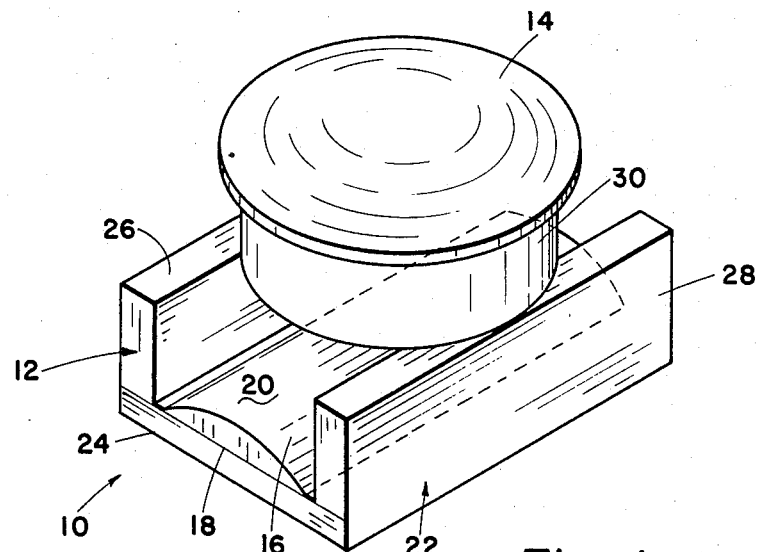
FIG. 1 is a perspective view of a magnifying apparatus embodying the invention.
Figure 2:
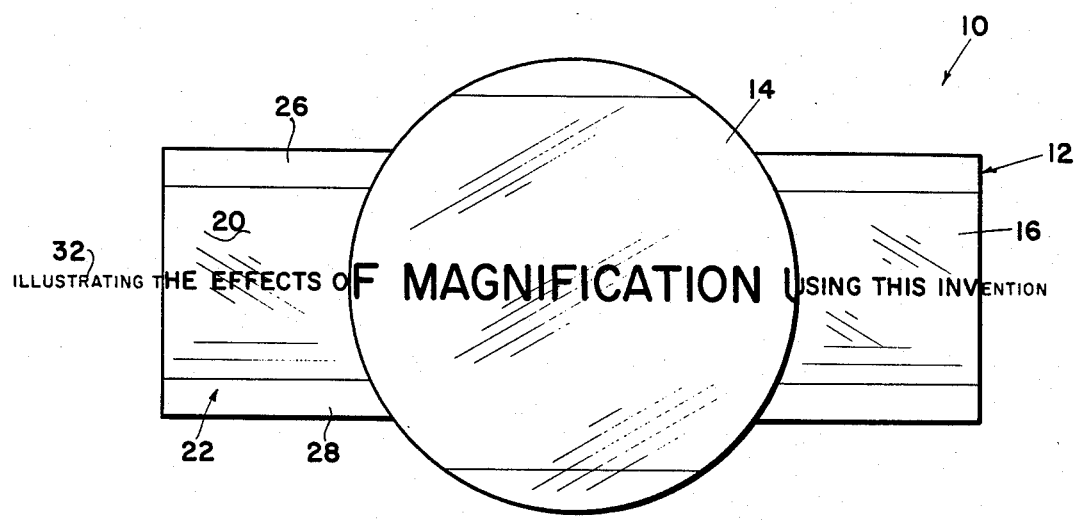
FIG. 2 is a plan view of the magnifying apparatus shown in FIG. 1, and depicts the use of the apparatus.

Referring to the drawings in detail, and particularly FIGS. 1 and 2, reference character 10 generally indicates a magnifying apparatus comprising a first magnifying element 12 and a second magnifying element 14. The first magnifying element 12 comprises an elongated or bar member 16 having a cross sectional configuration substantially a segment of a circle, and constructed from a suitable transparent material such as plastic or glass. One face or surface 18 of the bar 16 is substantially flat or planar and corresponds to the plane generated by a chord of a cross section of a cylinder of substantially any desired diametric size. The opposite face 20 of the bar 16 is a segment of the outer periphery of the cylinder from which the plane 18 is taken. Whereas the maximum depth of the segment-shaped bar 16 may be substantially as desired, it has been found that a relatively thin slice of a relatively large diameter cylinder provides extremely efficient results in the use of the device 10, as will be hereinafter set forth.

The bar 16 has shown in FIGS. 1 and 2 is mounted in a substantially U-shaped holder 22, and may be either rigidly secured therein or removably secured therein, as desired. The holder 22 is preferably constructed from a suitable transparent material, such as plastic, glass, or the like, and is provided with a substantially flat central portion 24 having spaced sidewalls 26 and 28 extending perpendicularly outwardly therefrom along the opposite edges thereof. The bar 16 is disposed on the upper surface of the flat portion 24, as viewed in FIG. 1, and the sidewalls 26 and 28 may be utilized for facilitating handling of the magnifying element 12 during use of the apparatus 10 as will be hereinafter set forth.

In addition, a cup member 30 is rigidly secured to the outer edges of the sidewalls 26 and 28 and spans the distance therebetween as particularly shown in FIG. 1. The cup 30 is also preferably constructed from a suitable transparent material, such as plastic, glass, or the like, and may be provided with a recess (not shown) at the outer or exposed end thereof, if desired, for facilitating loosely receiving the magnifying element 14 thereon. The magnifying element 14 is preferably constructed from a suitable transparent material as hereinbefore set forth, and is preferably of a substantially circular or disc-shaped configuration. At least one face thereof is convex for a purpose as will be hereinafter set forth.

In use, the first magnifying element 12 may be manually positioned in the proximity of indicia 32, or the like, whereby the bar 16 will overlay the indicia to be magnified, as particularly shown in FIG. 2. This may be easily accomplished by manually grasping the sidewalls 26 and 28 and manipulating the holder 22 for achieving the desired alignment between the bar 16 and the indicia 32, and for providing the desired spacing therebetween. Of course, the angular orientation of the bar 16 with respect to the plane of the indicia may also be selected as desired for achieving the most desirable power of magnification by the bar 16. The second magnifying element 14 may then be manually positioned in spaced relation with respect to the bar 16 and in substantial alignment with the portion of the idicia 32 for which maximum magnification is desired, as shown in FIG. 2. The magnifying element 14 may be angularly orientated with respect to the bar 16 as desired to achieve the optimum magnification. With the use of the two complementary magnifying elements 12 and 14, magnification is achieved at substantially universal viewing positions with respect to the apparatus 10. Since it is preferable that the entire apparatus 10 be constructed from a transparent material, no parts of the device interfere with the viewing of the magnified material. When the device 10 is not in use, the magnifying element 14 may be conveniently stored on the upper end of the cup 30, as shown in FIG. 1.

Figure 3:
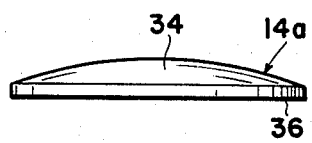
FIG. 3 is an end elevational view of one of the magnifying elements utilized in the invention.
Figure 4:
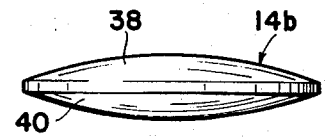
FIG. 4 is an end elevational view of another magnifying element utilized in the invention.

Referring now to FIGS. 3 and 4, magnifying elements 14a and 14b are shown which illustrate two modifications of configuration for the element 14. The magnifying element 14a is preferably of a substantially circular or disc-shaped configuration and is provided with one surface 34 which is convex, and an oppositely disposed surface 36 which is flat or planar. The magnifying element 14b is also preferably of substantially circular configuration and is provided with a first surface 38 which is convex, and an oppositely disposed second surface 40 which is also convex.

Figures 6, 7:
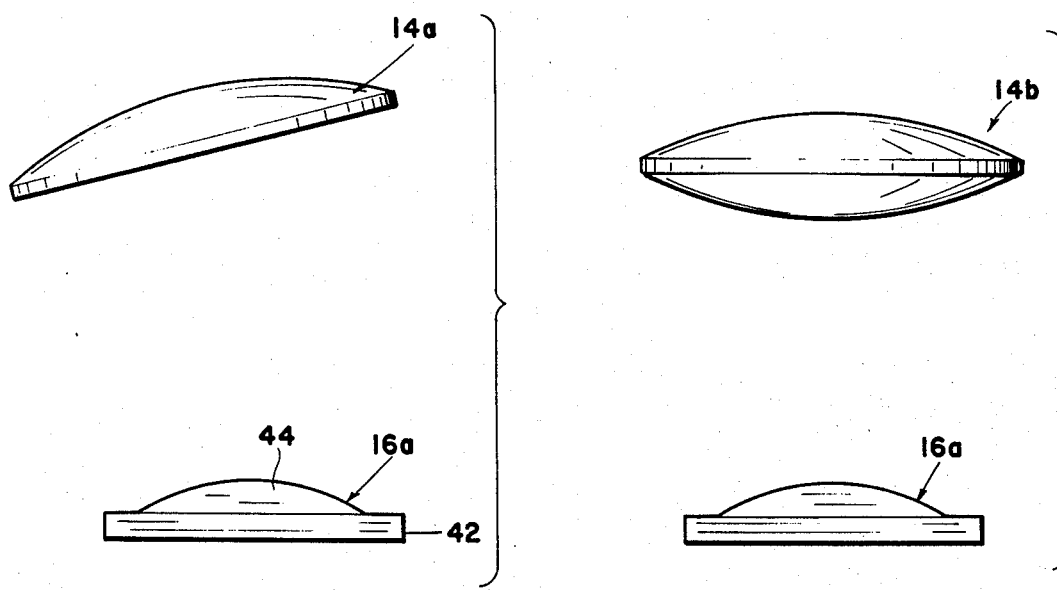
FIG. 6 is a side elevational view of a pair of complementary magnifying elements utilized in the invention.
FIG. 7 is a view similar to FIG. 6 and depicts a modified pair of complementary magnifying elements as utilized in the invention.

As seen in FIGS. 6 and 7, 16a indicates a modified magnifying element generally similar to the magnifying bar 16. The element 16a is an independent member comprising an elongated substantially flat base portion 42 having an arcuate portion 44 preferably integral therewith and extending substantially throughout the length thereof. The cross sectional configuration of the arcuate portion 44 is a segment of a circle, and the portion 44 is preferably cut or severed from a cylinder (not shown) of the desired diametric size. As hereinbefore set forth, it is preferable that the element 16a be severed from a relatively large diameter cylinder, and that the overall or maximum depth of the element 16a be a minimum, but there is no intention of limiting the element 16 or 16a to this dimensional selection.

The base portion 42 as shown in FIGS. 6 and 7 extends laterally beyond the side edges of the arcuate portion 44 for facilitating the handling of the element 16a during use of the apparatus 10. However, the base portion 42 may be completely eliminated, if desired, leaving only the arcuate portion 44.

The magnifying elements 16a may be utilized with either the elements 14, 14a, or 14b to provide great magnification in an inexpensive manner. The element 16a may be placed directly against the indicia 32 to be magnified, or manually supported in a selected spaced position with respect thereto. The element 14a may be disposed in spaced relation with respect to the element 16a, as particularly shown in FIG. 6, and may be disposed at substantially any desired angular orientation with respect thereto, whereby vision through the combined elements 14a and 16a produces relatively high power magnification. It will be apparent that the elements 16a and 14b may be similarly utilized for producing high magnification.

Figure 5:
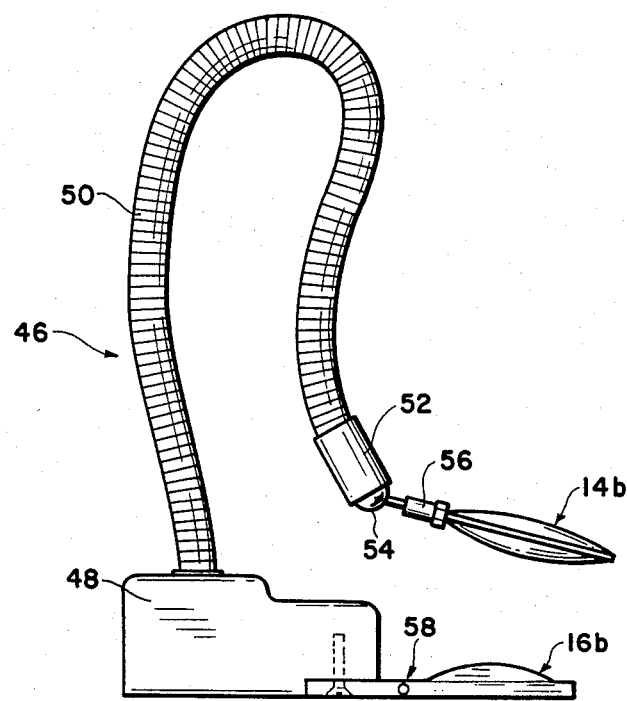
FIG. 5 is a side elevational view of a modified magnifying apparatus embodying the invention.

Referring now to FIG. 5, a modified magnifying apparatus is generally indicated at 46 which comprises a weighted base member 48 of any desired configuration or construction, as is well known, and a flexible gooseneck-type support arm 50 secured thereto and extending outwardly therefrom. The outer end of the gooseneck 50 is provided with a suitable coupling member or sleeve 52 providing a socket at the outer end thereof for supporting a ball member 54 therein in a manner for universal movement of the ball 54. A connector member 56 is carried by the ball 54 for movement simultaneously therebetween, and a magnifying element 14b, or the like, is suitable secured to the connector element 56 in any well known manner. A magnifying element 16b generally similar to the element 16a is secured to the base member by means of a universal connection means 58 whereby the angular position of the element 16b may be universally adjusted, as desired. In use, the magnification elements 14b and 16b cooperate in the manner as hereinbefore set forth for producing relatively high-power magnification.

From the foregoing it will be apparent that the present invention provides a novel magnifying apparatus wherein a pair of complementary magnifying elements cooperate to produce a relatively high-power magnification in an inexpensive and simple manner. One of the magnifying elements is an elongated bar having one surface substantially flat or planar, and the opposite surface arcuate, preferably being severed from a relatively large cylinder wherein the arcuate surface is a portion of the outer periphery of the cylinder and the planar surface is that surface defined by a chord of a circular section of the cylinder. The other magnifying element is preferably substantially circular or disc-shaped in configuration, and is provided with at least one convex surface. The two elements may be utilized in conjunction with one another, with the spacing and angular orientation therebetween variable in accordance with the requirements of the desired magnifying operation. The novel device is simple and efficient in operation and economical and durable in construction.

Whereas the present invention has been described in particular relation to the drawings attached hereto, it should be understood that other and further modifications, apart from those shown or suggested herein may be made within the spirit and scope of this invention.

What is claimed is:

1. Magnifying means comprising a first magnifying element constructed of a plastic material which magnifies in one direction only and having one flat surface and one arcuate surface oppositely disposed with respect thereto, a second magnifying element having at least one arcuate surface and which magnifies in all directions for cooperating with the first magnifying element and means for infinitely varying both of said elements with respect to spacing and angular orientation therebetween for facilitating focusing and to produce relatively high power magnification.

2. Magnifying means as set forth in claim 1 wherein the first of said magnifying elements comprises an elongated transparent bar having one flat surface and one convex surface, and the second of said magnifying elements is substantially disc shaped having a flat surface and a convex surface oppositely disposed with respect thereto.

3. Magnifying means as set forth in claim 1 wherein said second magnifying element is substantially disc shaped with the opposite sides thereof being of a convex configuration.

4. Magnifying means as set forth in claim 1 wherein the first magnifying element is severed from a cylinder having a relatively large diameter whereby the arcuate surface is a portion of the outer periphery of the cylinder.

* * * * *